(12) United States Patent
Yang et al.

(10) Patent No.: US 7,815,967 B2
(45) Date of Patent: Oct. 19, 2010

(54) CONTINUOUS PROCESS FOR DUCT LINER PRODUCTION WITH AIR LAID PROCESS AND ON-LINE COATING

(76) Inventors: Alain Yang, 2181 N. Stone Ridge La., Villanova, PA (US) 19085; Mike W. Damiani, 115 Eagle Dr., Plymouth Meeting, PA (US) 19462; Jerry J. Scullion, 1550 Peachtree Rd., Hatfield, PA (US) 19440

( * ) Notice: Subject to any disclaimer, the term of this patent is extended or adjusted under 35 U.S.C. 154(b) by 1879 days.

(21) Appl. No.: 10/851,535

(22) Filed: May 21, 2004

(65) Prior Publication Data
US 2004/0217507 A1 Nov. 4, 2004

Related U.S. Application Data

(63) Continuation-in-part of application No. 10/781,994, filed on Feb. 19, 2004, now abandoned, which is a continuation-in-part of application No. 10/689,858, filed on Oct. 22, 2003, now abandoned, and a continuation-in-part of application No. 09/946,476, filed on Sep. 6, 2001, now abandoned, and a continuation-in-part of application No. 10/766,052, filed on Jan. 28, 2004, now abandoned.

(51) Int. Cl.
*B05D 1/38* (2006.01)
*B05D 3/12* (2006.01)

(52) U.S. Cl. .................. 427/209; 427/407.1; 427/407.3; 427/412

(58) Field of Classification Search ............. 427/407.1, 427/407.3, 412, 421.1, 424, 425, 209
See application file for complete search history.

(56) References Cited

U.S. PATENT DOCUMENTS

| | | | |
|---|---|---|---|
| 3,670,731 A | 6/1972 | Harmon | |
| 3,671,615 A | 6/1972 | Price | |
| 3,687,712 A * | 8/1972 | Hartmann | 442/374 |
| 3,768,523 A | 10/1973 | Schroeder | |
| 3,794,708 A * | 2/1974 | Richards et al. | 156/189 |
| 3,849,226 A * | 11/1974 | Butz | 156/247 |
| 3,861,425 A | 1/1975 | Clark | |
| 4,017,659 A | 4/1977 | Brumlik | |
| 4,101,700 A | 7/1978 | Ray, Jr. et al. | |
| 4,133,653 A | 1/1979 | Soltis | |
| 4,201,247 A | 5/1980 | Shannon | |
| 4,310,587 A | 1/1982 | Beaupre | |
| 4,356,011 A | 10/1982 | Day et al. | |
| 4,379,804 A | 4/1983 | Eisele et al. | |
| 4,468,336 A | 8/1984 | Smith | |
| RE31,849 E | 3/1985 | Klein | |
| 4,751,134 A | 6/1988 | Chenoweth et al. | |
| 4,888,235 A | 12/1989 | Chenoweth et al. | |
| 4,889,764 A | 12/1989 | Chenoweth et al. | |
| 4,910,936 A | 3/1990 | Abendroth et al. | |
| 4,917,942 A | 4/1990 | Winters | |
| 4,946,738 A | 8/1990 | Chenoweth et al. | |
| 4,990,370 A * | 2/1991 | Terry et al. | 427/209 |
| 5,078,890 A | 1/1992 | Conche et al. | |
| 5,137,764 A | 8/1992 | Doyle et al. | |
| 5,215,407 A | 6/1993 | Brelsford | |
| 5,264,257 A | 11/1993 | Martinez et al. | |
| 5,332,409 A | 7/1994 | Dralle | |
| 5,336,286 A | 8/1994 | Alexander, Jr. et al. | |
| 5,350,620 A | 9/1994 | Sundet et al. | |
| 5,439,735 A | 8/1995 | Jamison | |
| 5,480,466 A | 1/1996 | Jackson et al. | |
| 5,501,872 A * | 3/1996 | Allen et al. | 427/180 |
| 5,588,976 A | 12/1996 | Miller | |
| 5,595,584 A | 1/1997 | Loftus et al. | |
| 5,600,919 A | 2/1997 | Kummermehr et al. | |
| 5,607,491 A | 3/1997 | Jackson et al. | |
| 5,624,471 A | 4/1997 | Gaeta et al. | |
| 5,685,938 A | 11/1997 | Knapp et al. | |
| 5,695,535 A | 12/1997 | Hintenlang et al. | |
| 5,728,187 A | 3/1998 | Kern et al. | |
| 5,785,725 A | 7/1998 | Cusick et al. | |
| 5,837,621 A | 11/1998 | Kajander | |
| 5,879,781 A | 3/1999 | Mehta et al. | |
| 5,883,020 A | 3/1999 | Bargo et al. | |
| 5,900,206 A | 5/1999 | Pellegrin et al. | |
| 5,910,367 A | 6/1999 | Kean et al. | |
| 5,932,665 A | 8/1999 | DePorter et al. | |

(Continued)

FOREIGN PATENT DOCUMENTS

EP 0 672 803 A2 9/1995

*Primary Examiner*—William Phillip Fletcher, III
(74) *Attorney, Agent, or Firm*—Duane Morris LLP

(57) ABSTRACT

A continuous method of making duct liner is provided, comprising the steps of: (i) forming at least one lane of duct liner insulation having a top and bottom surfaces and a pair of side edges, the duct liner insulation having a facing layer on at least a bottom surface thereof, wherein the bottom surface faces downward after the forming step; (ii) flipping the duct liner insulation and facing layer while the duct liner insulation is conveyed, whereby the top surface faces downward and the facing layer faces upward; and (iii) applying a water-resistant coating to the upwardly facing layer, wherein the duct liner insulation is conveyed as part of a continuous manufacturing process from the forming step to the applying step.

14 Claims, 9 Drawing Sheets

U.S. PATENT DOCUMENTS

| | | |
|---|---|---|
| 5,952,076 A | 9/1999 | Foster |
| 5,968,630 A | 10/1999 | Foster |
| 5,980,680 A | 11/1999 | Miller |
| 5,983,586 A | 11/1999 | Berdan, II et al. |
| 6,099,775 A | 8/2000 | Bargo et al. |
| 6,120,643 A | 9/2000 | Levit |
| 6,139,945 A | 10/2000 | Krejchi et al. |
| 6,180,233 B1 | 1/2001 | Shaw |
| 6,217,946 B1 | 4/2001 | Bolind et al. |
| 6,228,476 B1 | 5/2001 | Bogrett et al. |
| 6,267,252 B1 | 7/2001 | Amsler |
| 6,270,608 B1 | 8/2001 | Vair, Jr. et al. |
| 6,284,313 B1 * | 9/2001 | Matthews et al. ........... 427/244 |
| 6,331,350 B1 | 12/2001 | Taylor et al. |
| 6,368,609 B1 | 4/2002 | Fontenot et al. |
| 6,379,770 B2 | 4/2002 | Vair, Jr. et al. |
| 6,451,432 B1 | 9/2002 | Azzopardi et al. |
| 6,607,803 B2 | 8/2003 | Foster |
| 6,669,265 B2 | 12/2003 | Tilton et al. |
| 6,673,280 B1 | 1/2004 | Yang et al. |
| 7,083,693 B2 * | 8/2006 | Chen et al. ................... 156/79 |
| 2003/0008586 A1 | 1/2003 | Kajander et al. |
| 2003/0041626 A1 | 3/2003 | Yang et al. |
| 2003/0044566 A1 | 3/2003 | Yang et al. |
| 2003/0049488 A1 | 3/2003 | Yang et al. |
| 2003/0068943 A1 | 4/2003 | Fay |
| 2003/0087078 A1 | 5/2003 | Desrosiers et al. |
| 2003/0176131 A1 | 9/2003 | Tilton |
| 2003/0211262 A1 | 11/2003 | Ruid et al. |
| 2004/0137181 A1 | 7/2004 | Ruid et al. |
| 2005/0031819 A1 | 2/2005 | Mankell et al. |

* cited by examiner

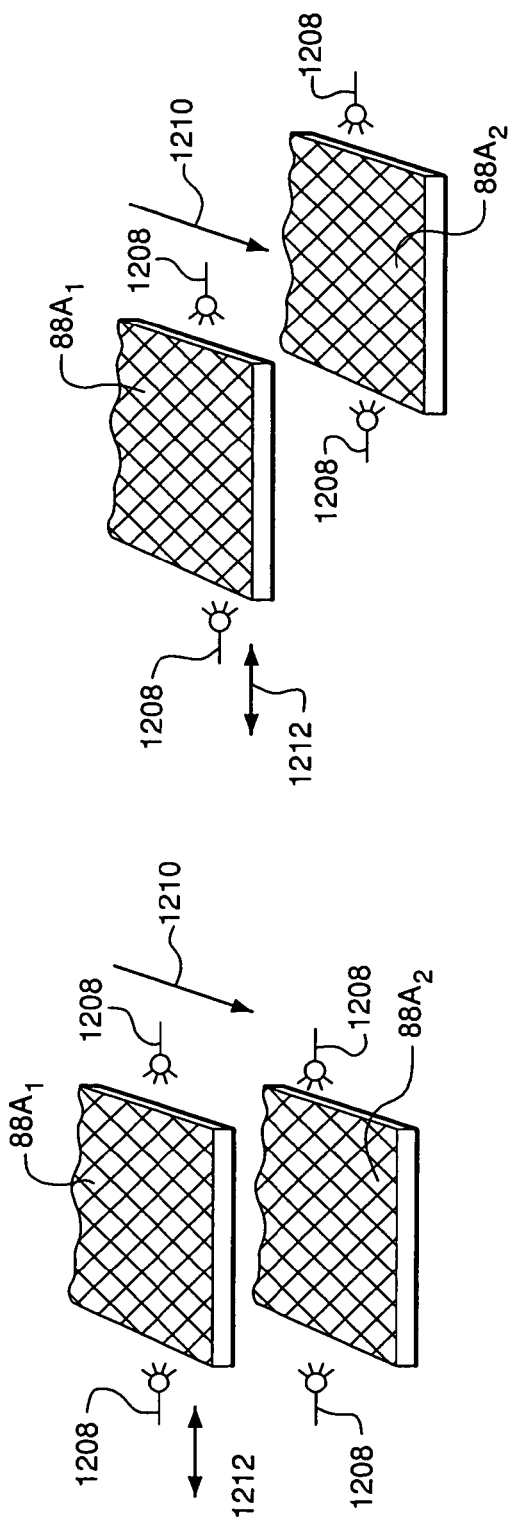
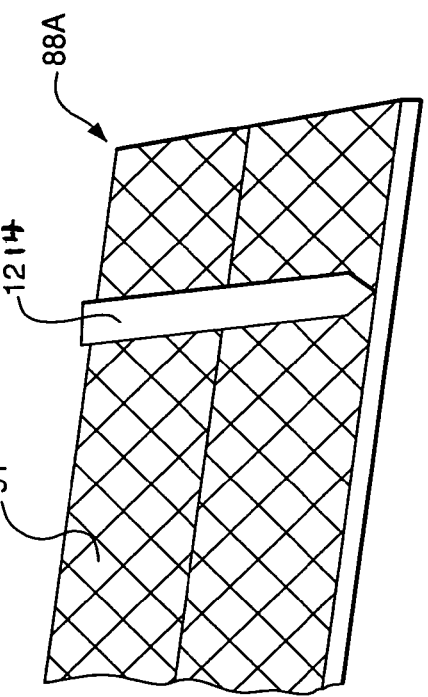
FIG. 9
FIG. 9A
FIG. 10

CONTINUOUS PROCESS FOR DUCT LINER PRODUCTION WITH AIR LAID PROCESS AND ON-LINE COATING

CROSS REFERENCE TO RELATED APPLICATIONS

This application is a continuation-in-part of U.S. patent application Ser. No. 10/781,994 filed Feb. 19, 2004 now abandoned, entitled "Formaldehyde-Free Duct Liner", which is a continuation-in-part of the following United States patent applications: U.S. patent application Ser. No. 10/689,858, filed on Oct. 22, 2003, now abandoned and is a CIP of U.S. patent application Ser. No. 09/946,476, filed on Sep. 6, 2001 now abandoned, and U.S. patent application Ser. No. 10/766,052, filed on Jan. 28, 2004 now abandoned, which are commonly assigned and hereby incorporated by reference.

This application is also related to U.S. Pat. No. 6,673,280, issued Jan. 6, 2004, and U.S. patent application Ser. No. 10/766,052, filed on Jan. 28, 2004, U.S. patent application Ser. No. 10/782,275, filed on Feb. 19, 2004, U.S. patent application Ser. No. 10/781,994, filed on Feb. 19, 2004, U.S. patent application Ser. No. 10/806,544 filed Mar. 23, 2004 and U.S. patent application Ser. No. 10/823,065 filed Apr. 12, 2004, which are also commonly assigned and hereby incorporated by reference herein.

FIELD OF THE INVENTION

The present invention relates to fiber insulation and, more particularly, to duct liners comprising inorganic or organic fibers and, preferably, continuous production methods of producing and coating duct liner and like insulation products.

BACKGROUND OF THE INVENTION

Ducts and conduits are used to convey air in building heating, ventilation and air conditioning (HVAC) systems. In many applications, especially in commercial and industrial constructions, the ducts are lined with flexible thermal and acoustic insulating material. The lining enhances the thermal efficiency of the duct work and reduces noise associated with movement of air therethrough. Duct liners may comprise any suitable organic material or inorganic material, e.g., mineral fibers such as fiber glass insulation or the like. Typical fiber glass duct liners, for example, are constructed as fiber glass mats having densities of about 1.5 to 3 pounds per cubic foot (pcf) and thicknesses of about 0.5 to 2 inches.

To prevent fiber erosion due to air flow, the insulation may include a coating or a facing layer on its inner or "air stream" surface. The air stream surface of the insulation is the surface that conveys air through the duct and is opposite the surface that contacts the duct sheet metal in the final duct assembly. Examples of such duct liners are provided in U.S. Pat. Nos. 3,861,425 and 4,101,700. Several insulation duct liners are marketed under the trade designations TOUGHGARD® duct liner by CertainTeed Corp. of Valley Forge, Pa., AEROFLEX® and AEROMAT® duct liner by Owens Corning Fiberglass Corp. of Toledo, Ohio, PERMACOTE®, and POLYCOUSTIC™ duct liner by Johns Manville Corp. of Denver, Colo.

As an alternative to coated duct liners, manufacturers such as CertainTeed Corp. and Knauf Fiber Glass GmbH offer duct liners having glass fiber insulation covered with a layer of non-woven facing material which defines the air stream surface of those products. The facing material produces a durable surface that protects the air duct from fiber erosion.

In traditional duct liners, phenolic powder resin binders are used to bond the fibers together. These resin binders, such as phenol-formaldehyde, generally contain formaldehyde. Although there is no health risk with the traditional fiber glass duct liners using formaldehyde-containing binders, formaldehyde at higher levels may cause skin irritation and sensitivity. In consideration of such concerns, manufacturers of insulation products have started to offer formaldehyde-free products to provide the consumers an alternative to the traditional insulation products including duct liners.

These currently existing formaldehyde-free insulation products use water soluble acrylic binders that are formaldehyde-free in place of the phenolic powder resin binders. Some examples of formaldehyde-free binders used in such applications can be found in U.S. Pat. Nos. 5,932,665 and 6,331,350. However, because these acrylic binders are applied in aqueous form, they are generally more difficult to use in manufacturing process compared to binders in dry form. Thus, there is a need for formaldehyde-free duct liners fabricated with dry formaldehyde-free binders without compromising on the manufacturability and the performance characteristics of the duct liners.

It is also recognized that there is a need for a continuous process for forming duct liner by the air laid manufacturing method. For various reasons, such as limitations on manufacturing space, the process of making a faced duct liner is not continuous with the process of coating the duct liner with a water resistant layer. In the prior art process, after the duct liner is formed with a facing layer on the air stream surface thereof, the duct liner is then cut to length and rolled for temporary storage. The roll is later moved to a separate coating system, where it is unwound, coated and then rolled and packaged. The transfer of the basic mats from the production line to the coating line is a manual process that results in low product efficiency and increased labor demands.

SUMMARY OF THE INVENTION

A continuous method of and system for making duct liner is provided. At least one lane of duct liner insulation having a top and bottom surfaces and a pair of side edges is formed in a forming apparatus, the duct liner insulation having a facing layer on at least a bottom surface of the duct liner, wherein the bottom surface faces downward after the forming step or stage. The duct liner insulation and facing layer are flipped in a flipping stage while the duct liner insulation is conveyed, whereby the top surface faces downward and the facing layer faces upward. A water-resistant coating is applied to the upwardly facing layer with a coating apparatus, wherein the duct liner insulation is conveyed with a conveying apparatus as part of a continuous manufacturing process from the forming step to the applying step.

In another embodiment, a continuous method of and system for making duct liner is provided where at least two lanes of duct liner insulation are formed each having a top and bottom surfaces and a pair of side edges, each lane having a facing layer on at least one of the top and bottom surfaces. The lanes are vertically separated and while vertically separated, a water-resistant coating is applied to the side edges of the lanes of duct liner insulation.

By merging the coating and mat formation processes into a continuous process, the efficiency of the process is improved and labor demands are decreased. In order to facilitate this merger and to further improve the efficiency of the process, in one embodiment, the process and system utilize a flipping stage and/or a vertical separation stage. The flipping stage orients the facing layer for application of the water-resistant coating, and the vertical separation stage conserves factory space during edge coating. The terms "continuous process" means that the manufacturing and coating processes are performed substantially as part of the same manufacturing process, i.e., the formed mat is automatically conveyed after formation to the coating stages as opposed to being temporarily stored and then physically transported to a coating stage after temporary storage.

BRIEF DESCRIPTION OF THE DRAWINGS

FIGS. 9 and 9A illustrates edge coating of two vertically separated lanes of duct liner; and FIG. 10 illustrates a knife coater for coating the air stream surface of the duct liner with a water-resistant coating.

The features shown in the above referenced drawings are not intended to be drawn to scale nor are they intended to be shown in precise positional relationship. Like reference numbers indicate like elements.

DETAILED DESCRIPTION OF THE INVENTION

According to an aspect of the present invention, the substantially formaldehyde-free duct liners are formed by blending at least one fiber component with at least one non-liquid substantially formaldehyde-free binder. The formaldehyde-free binder may be plastic-containing bonding fibers or powdered binders other than phenol-formaldehyde type binders. The plastic-containing bonding fiber or other binder or their combination in the final product may be between about 10 to 30 wt. % and preferably between 12 to 25 wt. % and more preferably about 15 to 20 wt. % of the final product.

Figure 1:
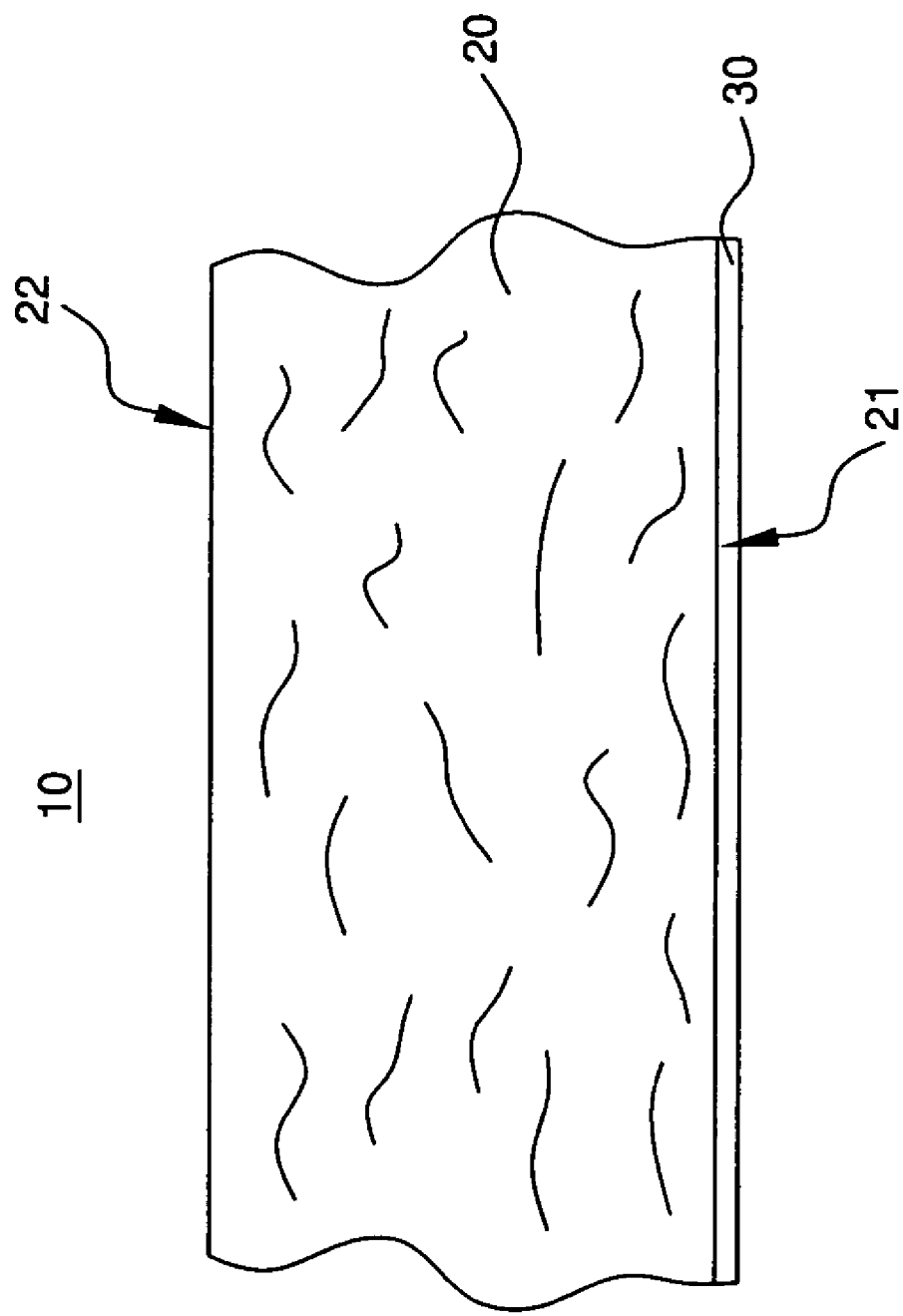
FIG. 1 is a cross-sectional view of an exemplary embodiment of a duct liner according to an aspect of the present invention.

FIG. 1 is a cross-sectional view of an exemplary substantially formaldehyde-free duct liner 10 comprising a final fiber mat 20 having a first side 21, a second side 22 and a nonwoven scrim facing layer bonded to the first side 21. The final fiber mat 20 and, thus, the duct liner 10 has a density of about 16 to 56 kg/m³ and preferably about 24 to 48 kg/m³. The gram weight of the duct liner 10 is in the range of about 50 to 350 gm/m² and preferably about 65 to 310 gm/m². The thickness of the duct liner may be in the range of about 0.6 to 25.4 cm and preferably about 1.3 to 20.3 cm, and more preferably 1.2 to 7.6 cm.

In one embodiment of the present invention, the fiber component of the substantially formaldehyde-free duct liners may comprise textile glass fibers, rotary glass fibers, organic fibers, or natural fibers such as wood fibers, hemp fibers, and cellulose fibers, etc. or a combination thereof. By employing one or more of these fibers in the formulation for the duct liners, it is possible to customize the final properties of the duct liners.

According to one preferred embodiment of the present invention, the fiber component of the substantially formaldehyde-free duct liner may be textile glass fibers. The textile glass fibers used in the duct liner product of the present invention may have diameters of greater than about 1 micrometer to 20 micrometers and more preferably about 5 micrometers up to about 16 micrometers and they are generally precut into fiber segments having average length of about 1 to 20 cm and more preferably about 2.5 to 12.5 cm.

In another embodiment of the present invention, the fiber component of the substantially formaldehyde-free duct liners may be rotary fibers. Rotary fibers are generally made by spinners using centrifugal force to extrude molten glass or polymer through small openings in the sidewall of a rotating spinner. Rotary fibers are generally smaller in diameter than textile glass fibers and may be in the range of about 2 to 5 μm. Rotary fibers have average length of up to about 12.7 cm (5 inches). The textile glass fibers and the rotary fibers may be used in combination to form the final mat 20.

In another embodiment of the present invention, the textile glass fibers and the rotary fibers described above may be used in combination for the fiber component of the formaldehyde-free duct liners. In other embodiments of the present invention, organic fibers or natural fibers such as wood fibers, hemp fibers, and cellulose fibers, etc., may be used. These fibers may be used in any combination for the fiber component of the duct liner.

The plastic-containing bonding fibers used as the binder in the substantially formaldehyde-free duct liner of the present invention may comprise thermoplastic resin, thermosetting resin, or both. The plastic-containing bonding fibers may be bi-component type polymeric fibers, mono-component type polymeric fibers, plastic-coated mineral fibers, such as, thermoplastic-coated glass fibers, or a combination thereof. The bi-component polymeric fibers are commonly classified by their fiber cross-sectional structure as side-by-side, sheath-core, islands-in-the sea and segmented-pie cross-section types. In a preferred embodiment of the present invention, the sheath-core type bi-component polymer fibers are used.

If higher strength is desired in the final product, concentric type sheath-core bi-component polymer fibers may be used. If bulkiness is desired in the final product, eccentric type sheath-core bi-component polymer fibers may be used.

The bi-component polymeric fibers have a core material covered in a sheath material that has a lower melting temperature than the core material. Both the core and the sheath material may be a thermoplastic polymer such as, for example, polyethylene, polypropylene, polyester, polyethylene teraphthalate, polybutylene teraphthalate, polycarbonate, polyamide, polyvinyl chloride, polyethersulfone, polyphenylene sulfide, polyimide, acrylic, fluorocarbon, polyurethane, or other thermoplastic or thermosetting polymers. The core and the sheath materials each may be made of different thermoplastic or thermosetting polymers or they may be made of the same thermoplastic or thermosetting polymers but of different formulation so that the sheath material has lower melting point than the core material. Typically, the melting point of the sheath is between about 110° and 180° Centigrade. The melting point of the core material is typically about 260° Centigrade. The bi-component polymeric fibers used in the duct liner of the present invention may have an average fiber diameter of about 10 to 20 μm and preferably about 16 μm. The average length of the bi-component plastic-containing bonding fibers is between about 0.63 to 12.7 cm and preferably between about 5.1 to 10.2 cm.

In another embodiment of the present invention, the non-liquid substantially formaldehyde-free binder may be any suitable thermoplastic powdered binder or thermosetting resin powdered binder. The powder binder may be used alone or in combination with the plastic-containing bonding fibers and blended with the fiber component of the duct liners. An example of a thermoplastic powder binder is VINNEX® polymer powder binders available from Wacker-Chemie GmbH. Mixing with the plastic-containing bonding fibers may be particularly beneficial when the plastic-containing bonding fibers are bi-component polymeric fibers. Because the core component of the bi-component polymeric fibers remain in fiber form to provide reinforcement to the duct liner, making the duct liner very strong for handling in the field during duct fabrication. By using a mix of the bi-component polymeric fibers and a powder binder in varying proportions, the toughness of the duct liners can be controlled for ease of cutting.

In this exemplary embodiment of the substantially formaldehyde-free duct liner, a facing layer 30 is bonded to the first side 21 of the fiber mat 20. In another embodiment, facing layers may be bonded to both the first side 21 and the second side 22 of the fiber mat 20 if necessary. At least one of the two sides of the duct liners will generally have a facing 30 to be designated as the air stream surface. The facing layer 30 is preferably a bonded non-woven scrim made of randomly oriented glass or resinous fibers bonded with adhesive or melt bonds. A preferred material for the non-woven scrim for this application includes glass fibers in a formaldehyde-free resinous binder. More preferred materials include a thin, bonded, non-woven fiber glass mat oriented in a random pattern, having sized glass fibers bonded with a formaldehyde-free resinous binder, preferably of the same composition of the binder used to join the fibers in mat 20, but can also be a compatible resin.

An exemplary non-woven scrim layer may be formed from a sheet of non-woven material comprising randomly oriented inorganic fibers, and in a preferred embodiment, randomly oriented glass fibers. Non-woven materials are sheets of randomly oriented natural or synthetic fibers, such as polyolefins, polyamide (i.e. nylon), polyester or rayon, or glass often held in a sheet form by a binder. Binders typically used in the non-wovens are based on a polymeric material, such as an acrylic resin, a vinyl-acrylic resin, etc. To be used in the fabrication of the formaldehyde-free duct liners of the present invention, the non-woven material must also be made with formaldehyde-free binders. In an exemplary embodiment, the non-woven layer 91, for example, is glass fiber non-wovens available from Lydall Industrial Thermal Solutions, Inc. as MANNIGLAS® 1900 or MANNIGLAS® 1908. These non-wovens are made with formaldehyde-free binders. Generally, thinner scrim materials are preferred, because they allow better penetration of the binder material that bonds the non-woven scrim 30 to fiber mat 20.

The formaldehyde-free duct liners of the present invention is produced in accordance with air laid processing steps generally known in the art. The particular configuration of the fabrication apparatus used, however, may vary depending on the number and the type of fibers used for the fiber components and the number and the types of formaldehyde-free binders used.

Figure 2:
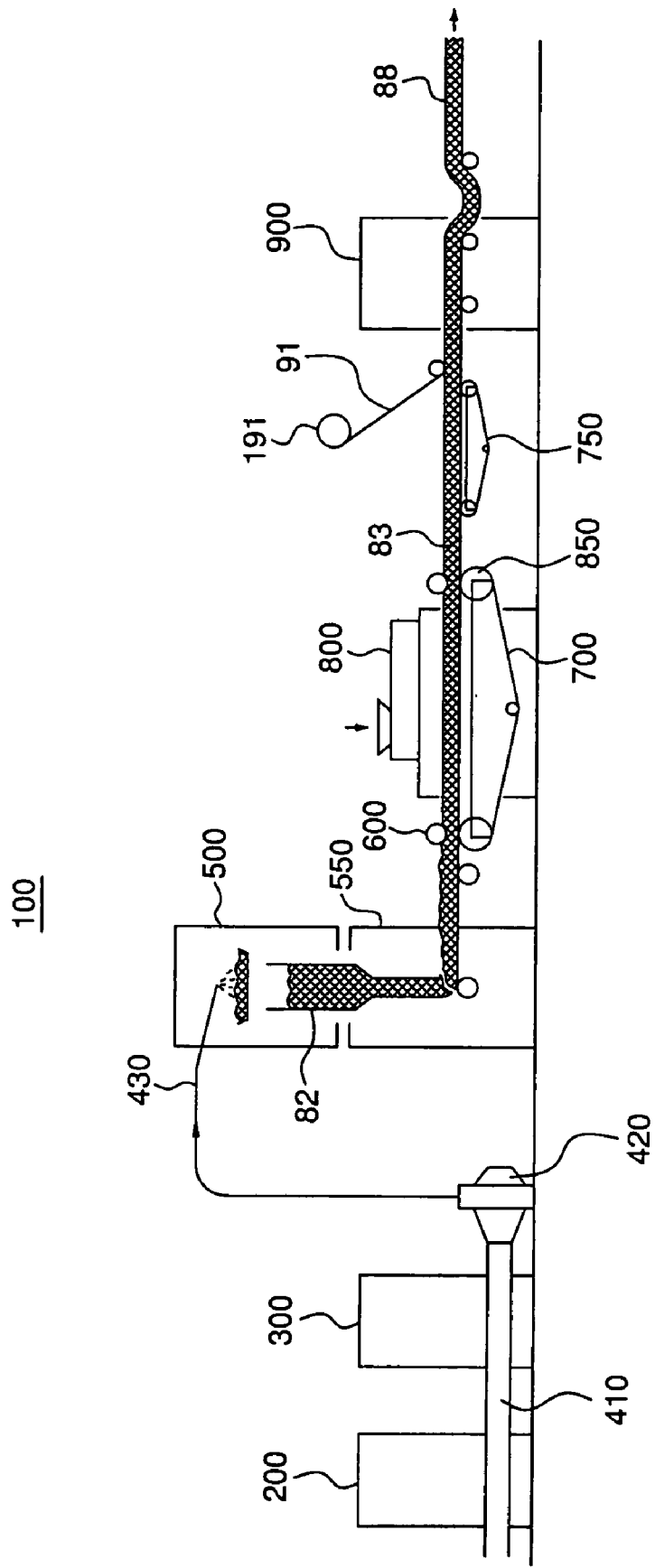
FIG. 2 is a schematic illustration of an apparatus for forming the duct liner of the present invention.

As an example, an air laid process that may be employed in fabricating duct liners according to an embodiment of the present invention will now be described. In a preferred method of forming the duct liners of the present invention, an air laid non-woven process equipment available from DOA (Dr. Otto Angleitner G.m.b.H. & Co. KG, A-4600 Wels, Daffingerstasse 10, Austria), apparatus 100 illustrated in FIGS. 2-5, may be used. In this example, a formaldehyde-free duct liner of the invention is formed by blending textile glass fibers with bi-component polymer fibers as the binder. As illustrated in FIG. 2, the apparatus 100 includes bale openers 200 and 300, one for each type of fiber. The textile glass fibers are opened by the bale opener 200 and the bi-component polymer fibers are opened by the bale opener 300.

Figure 3A:
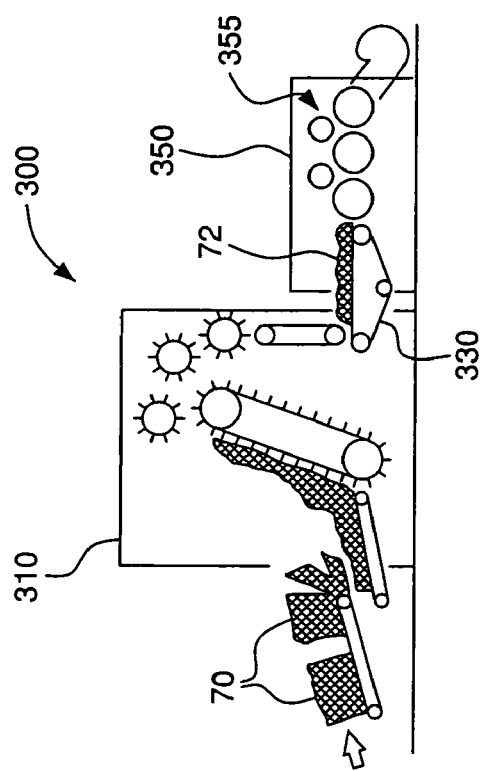
FIG. 3a-3c are detailed schematic illustrations of the bale openers of the apparatus of FIG. 2.

FIG. 3a is a detailed illustration of the bale opener 200. The textile glass fibers are provide in bulk form as bales 60. The bales 60 are fed into the bale opener which generally comprise a coarse opener 210 and a fine opener 250. The fibers in the bales 60 may be pre-chopped or cut into segments of about 1 to 20 cm and more preferably about 2.5 to 12.5 cm long to enhance the fiber opening process. After being opened by the coarse opener 210, the textile glass fibers are weighed by an opener conveyor scale 230. The opener conveyor scale 230 monitors the amount of opened textile glass fibers being supplied to the process by continuously weighing the supply of the opened textile fibers 62 as they are being conveyed. Next, the coarsely opened textile glass fibers are finely opened by the fine opener's picker 255. The opening process fluffs up the fibers to decouple the clustered fibrous masses in the bales and enhances fiber-to-fiber separation.

Figure 3B:
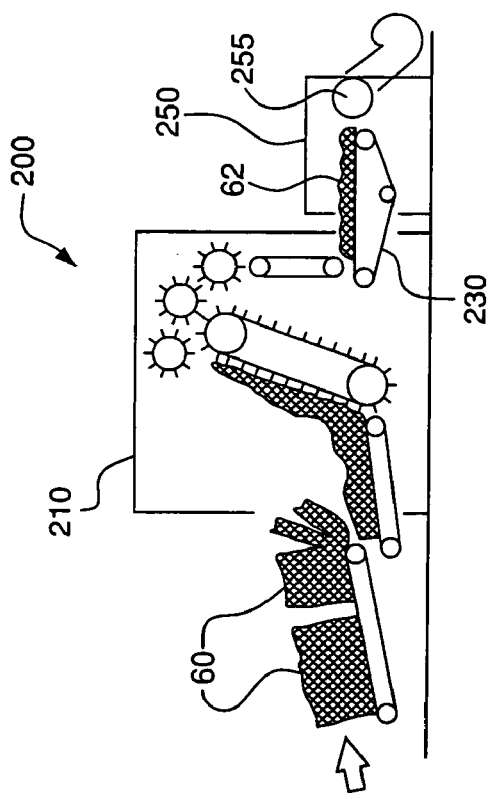

FIG. 3b is a detailed illustration of the bale opener 300. The bi-component polymer fibers are provided in bulk form as bales 70. The bales 70 are fed into the bale opener 300. The polymer fibers are first opened by a coarse opener 310 and weighed by an opener conveyor scale 330. The opener conveyor scale 330 monitors the amount of the opened plastic-containing bonding fibers being supplied to the process by continuously weighing the supply of the opened polymer fibers 72. Next, the coarsely opened polymer fibers are finely opened by the fine opener 350 and its pickers 355. For illustrative purpose, the fine opener 350 is shown with multiple pickers 355. The actual number and configuration of the pickers would depending on the desired degree of separation of the opened fibers into individual fibers. The bale openers 200 and 300, including the components described above, may be provided by, for example, DOA's Bale Opener model 920/920TS.

Illustrated in FIG. 2 is a pneumatic transport system for transporting the opened fibers from the bale openers 200 and 300 to the down stream processing stations of the apparatus 100. The pneumatic transport system comprises a first transport conduit 410 in which the opened fibers are blended; an air blower 420; and a second transport conduit 430 for transporting the blended fibers up to the fiber condenser 500.

Figure 3C:
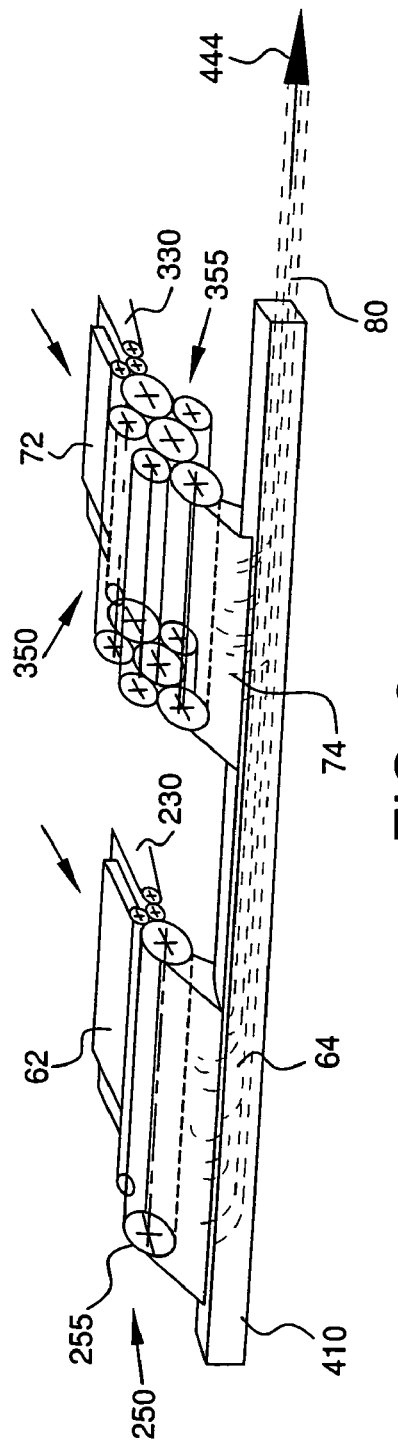

FIG. 3c illustrates opened textile glass fibers 64 and opened bi-component polymer fibers 74 being discharged into the first transport conduit 410 from their respective fine openers 250 and 350. The airflow in the first transport conduit 410 generated by the primary air blower 405 is represented by the arrow 444. The opened fibers 64 and 74 enters the air stream and are blended together into blended fibers 80. The ratio of the textile glass fibers and the bi-component polymer fibers are maintained and controlled at a desired level by controlling the amount of the fibers being opened and discharged by the bale openers using the weight information from the opener conveyor scales 230 and 330. As mentioned above, the conveyor scales 230, 330 continuously weigh the opened fiber supply for this purpose. In this example, the fibers are blended in a given ratio to yield the final duct liner mat containing about 15 to 20 wt. % of the plastic-containing bonding fibers.

Although one opener per fiber component is illustrated in this exemplary process, the actual number of bale openers utilized in a given process may vary depending on the particular need. For example, one or more bale openers may be employed for each fiber component.

Figure 4:
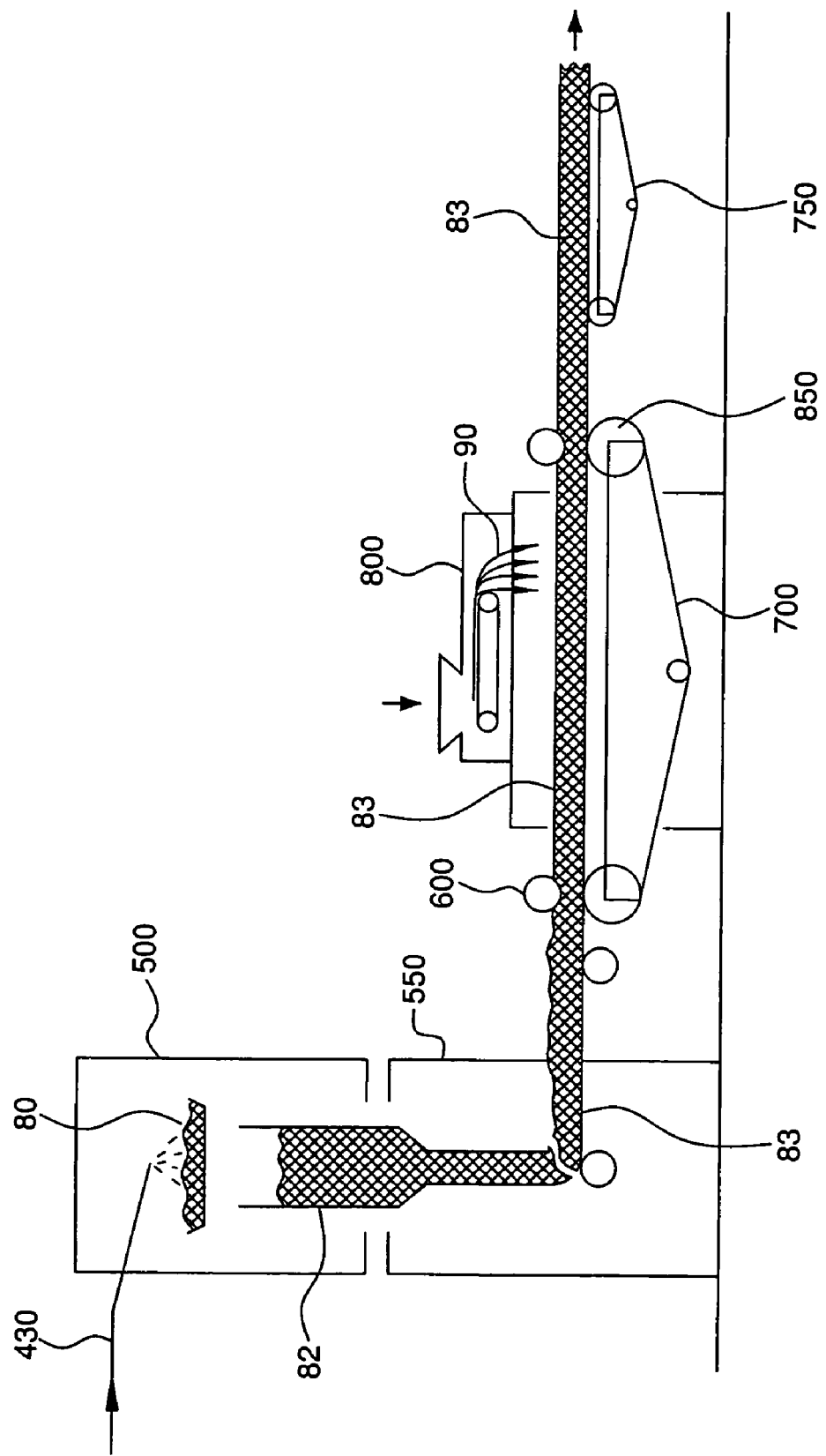
FIG. 4 is a detailed schematic illustration of another section of the apparatus of FIG. 2.

The blended fibers 80 are transported by the air stream in the pneumatic transport system 400 via the second transport conduit 430 to a fiber condenser 500. Referring to FIG. 4, the fiber condenser 500 condenses the blended fibers 80 into less airy fiber blend 82. The condensing process separates air from the blend without disrupting the uniformity (or homogeneity) of the blended fibers. The fiber blend 82 is then formed into a continuous sheet of mat 83, which has yet to be bonded or cured depending upon whether a thermoplastic or thermosetting resin bonding agent is employed, by the feeder 550. At this point, the mat 83 may be optionally processed through a sieve drum sheet former 600 to adjust the openness of the fibers in the mat 83. The mat 83 is then transported by another conveyor scale 700 during which the mat 83 is continuously weighed to ensure that the flow rate of the blended fibers through the fiber condenser 500 and the sheet former 600 is at a desired rate. The conveyor scale 700 is in communication with the first set of conveyor scales 230 and 330 in the bale openers. Through this feed back loop set up, the weight of the opened fibers measured at the conveyor scales 230 and 330 are compared to the weight of the mat 83 measured at the conveyor scale 700 to determine whether the amount of the opened fibers being fed into the process at the front end matches the rate at which the mat 83 is being formed at the feeder 550. Thus, the feed back loop set up effectively compares the feed rate of the opened fibers and the flow rate of the blended fibers through the feeder 550 and adjusts the speed of the bale openers and the rate at which the bales are being fed into the openers. This ensures that the bale openers 200 and 300 are operating at appropriate speed to meet the demand of the down stream processing. This feed back set up is used to control and adjust the feed rate of the opened fibers and the line speed of the conveyor scale 700 which are the primary variables that determine the gram weight of the mat 83. The air laid non-woven process equipment 100 may be provided with an appropriate control system (not shown), such as a computer, that manages the operation of the equipment including the above-mentioned feed back function.

In an embodiment of the present invention that uses a formaldehyde-free powder binder rather than the plastic-containing bonding fibers, a powder binder feeder 800 may be provided to apply the powder binder 90 to the mat 83. The powder binder feeder 800 may be positioned to apply the powder binder 90 evenly over the mat 83 as the mat is leaving the conveyor scale 700.

A second sieve drum sheet former 850 is used to further adjust the fibers' openness and blend with powder binder (if used) before curing or heating the mat 83. A conveyor 750 then transports the mat 83 to a curing or heating oven 900 (FIG. 2). For example, the condenser 500, feeder 550, sieve drum sheet former 600, conveyor scale 700, powder binder feeder 800, and the second sieve drum sheet former 850 may be provided using DOA's Aerodynamic Sheet Forming Machine model number 1048.

In one embodiment of the present invention, a continuous web of glass fiber non-woven facing layer 91 may be dispensed from a roll 191 and is applied to at least one of the two major sides of the mat 83 before the mat 83 enters the curing or heating oven 900. The non-woven facing layer 91 is applied to the major side of the mat 83 intended to be the air stream surface of the duct liner. In the exemplary process illustrated in FIG. 2, the non-woven facing layer 91 is applied to the major side that is the top side of the mat 83 as it enters the curing or heating oven 900, but depending on the particular need and preference in laying out the fabrication process, the non-woven facing layer 91 may be applied to the bottom side of the mat 83. In another embodiment of the present invention, a non-woven facing layer may be applied to both sides of the mat 83.

After the non-woven layer 91 is applied, the mat 83 is then fed into a curing or heating oven 900 to cure or heat the plastic-containing bonding fibers. Whether this process step is a curing step or a heating step depends on whether the binding agent used, the plastic-containing bonding fibers, is a thermoplastic type or a thermosetting type polymer. The curing or heating oven 900 is a belt-furnace type. The curing or heating temperature is generally set at a temperature that is higher than the curing or melting temperature of the binder material. In this example, the curing or heating oven 900 is set at a temperature higher than the melting point of the sheath material of the bi-component polymeric fibers but lower than the melting point of the core material of the bi-component polymeric fibers. In this example, the bi-component polymer fibers used is Celbond type 254 available form KoSa of Salisbury, N.C., whose sheath has a melting point of 110° C. And the curing or heating oven temperature is preferably set to be somewhat above the melting point of the sheath material at about 145° C. The sheath component will melt and bond the textile glass fibers and the remaining core of the bi-component polymeric fibers together into a final mat 88 having a substantially uniform density throughout its volume. The plastic-containing bonding fibers are in sufficient quantity in the mat 83 to bond the non-woven layer 91 to the mat. The core component of the bi-component polymeric fibers in the final mat 88 provide reinforcement to the resulting duct liner.

In another embodiment of the present invention, the curing or heating oven 900 may be set to be at about or higher than the melting point of the core component of the bi-component polymeric fiber. This will cause the bi-component fibers to completely or almost completely melt and serve generally as a binder without necessarily providing reinforcing fibers. Because of the high fluidity of the molten plastic fibers, the glass fiber mat will be better covered and bounded. Thus, less plastic-containing bonding fibers may be used.

In another embodiment of the present invention, mono-component polymeric fibers may be used as the binder rather than the bi-component polymeric fibers. The mono-component polymeric fibers used for this purpose may be made from the same thermoplastic polymers as the bi-component polymeric fibers. The melting point of various mono-component polymeric fibers will vary and one may choose a particular mono-component polymeric fiber to meet the desired curing or heating temperature needs. Generally, the mono-component polymeric fibers will completely or almost completely melt during the curing or heating process step and bind the textile glass fibers.

In another embodiment of the present invention, a powder binder may be used rather than the plastic-containing bonding fibers. The curing or heating oven 900 will be set at a temperature appropriate to cure the powder binder. In an embodiment where the powder binder and the plastic-containing bonding fibers are used in combination, preferably the powder binder is selected to have a curing or melting temperature that matches the melting point of the plastic-containing bonding fibers to allow the fiber mat to be cured or formed into a final mat in a single pass through the curing or heating oven 900.

After the curing or heating step, a series of finishing operations transform the final mat 88 into a duct liner. The final mat 88 exiting the curing or heating oven 900 is cooled in a cooling section (not shown) and the edges of the mat are cut to provide a mat having a desired width. Then, the edges and the non-woven scrim are coated with water resistant epoxy or latex foam, which makes the duct liner resistant to water penetration. The coated mat is then dried, cooled, sized into desired lengths and packaged. The duct liner and/or the facing layer may be further treated with anti-microbial agent to resist growth of fungi or bacteria.

Figure 5:
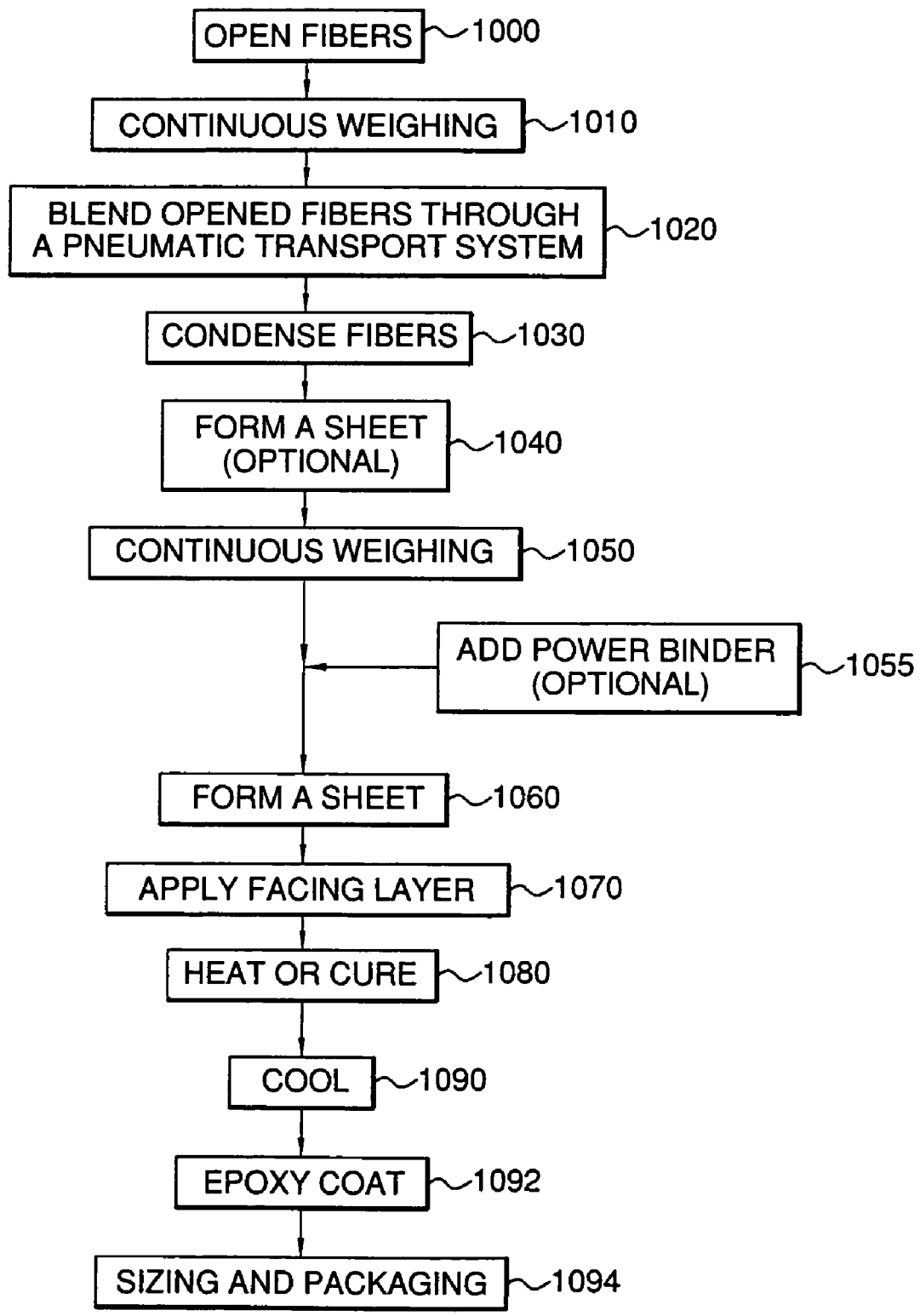
FIG. 5 is a flow chart diagram of a process for forming the exemplary duct liner of FIG. 1.

FIG. 5 is a flow chart diagram of the exemplary process.

At step 1000, the bales of the at least one fiber component of the duct liner are opened. If plastic-containing bonding fibers are used as the binder then the bonding fibers are also opened at this step.

At step 1010, the opened fibers are weighed continuously by one or more conveyor scales to control the amount of each fibers being supplied to the process ensuring that proper ratio of fiber(s) are blended.

At step 1020, the opened fibers are blended and transported to a fiber condenser by a pneumatic transport system which blends and transports the opened fiber(s) in an air stream through a conduit.

At step 1030, the opened fibers are condensed into more compact fiber blend and formed into a continuously feeding sheet of mat by a feeder.

At an optional step 1040, a sieve drum sheet former may be used to adjust the openness of the fiber blend in the mat.

At step 1050, the mat is continuously weighed by a conveyor scale to ensure that the flow rate of the blended fibers through the fiber condenser and the sheet former is at a desired rate. The information from this conveyor scale is fed back to the first set of conveyor scale(s) associated with the bale openers to control the bale opener(s) operation. The conveyor scales ensure that a proper supply and demand relationship is maintained between the bale opener(s) and the fiber condenser and sheet former.

At an optional step 1055, a powder binder may be applied to the mat as the continuously fed mat is leaving the conveyor scale.

At step 1060, a second sieve drum sheet former blends the powder binder (if used) into the fiber matrix of the mat and adjusts the openness of the fibers to a desired level.

At step 1070, a non-woven scrim facing may be applied to at least one side of the mat before the curing and/or heating step.

At step 1080, the mat is converted into a final mat by being cured and/or heated in a belt-furnace type curing or heating oven. The curing or heating oven is set at a temperature higher than the curing or thermosetting temperature of the particular formaldehyde-free binder being used.

At step 1090, the final mat is cooled.

At step 1092, the edges of the final mat and the non-woven scrim facing is coated with epoxy foam to provide water resistant surface to the final duct liner and cooled.

At step 1094, the coated final mat is cut to desired sizes and packaged for storage or shipping. At this step, the duct liner and/or the facing layer may be treated with anti-microbial agent to resist growth of fungi or bacteria.

According to another embodiment of the present invention, a reinforcement layer of a glass non-woven sheet may be used as a base layer for the duct liner of the present invention to provide additional mechanical support. The non-woven sheet may be applied to the mat 83 at the bottom to the mat 83 and heated or cured together. The binding action of the plastic-containing bonding fibers at the elevated temperature in the subsequent curing or heating step bonds the non-woven sheet to the mat 83.

The plastic-containing bonding fiber or other binder or their combination in the final product may be between about 10 to 30 wt. % and preferably between 12 to 25 wt. % and more preferably about 15 to 20 wt. %.

The use of the plastic-containing bonding fibers as the formaldehyde-free binder allows the duct liner fabrication process to remain dry which is simpler than using acrylic liquid binders as the formaldehyde-free binder. Also, because the curing or melting temperature for plastic-containing bonding fibers is lower than that of the conventional phenolic resin binders, the manufacturing process associated with the formaldehyde-free glass fiber duct liners consumes less energy. For example, the curing or heating ovens used in the manufacturing process described above are set to be less than about 200° C. and preferably about 145° C. rather than about 205° C. or higher typically required for curing phenol resin binders. Also, because of the absence of formaldehyde out gassing from the binder material during the fabrication process, there is no need for special air treatment equipment to remove formaldehyde from the curing or heating oven's exhaust. These advantages translate into lower manufacturing cost and less air pollution.

The use of the plastic-containing bonding fibers also improves the durability of the duct liner because the plastic-containing bonding fibers provide stronger adhesion between the glass fiber mat and the non-woven facing material. Furthermore, unlike the thermosetting phenolic resin binders, that are rigid and brittle when cured, the plastic-containing bonding fibers are thermoplastic polymers and are more flexible and less likely to crack and generate dust through handling. Thus, less dust is generated during the production of the duct liners as well as at the job sites where the duct liners are applied to the metal ducts.

The color of the basic duct liner mat as produced from the above-described process is generally white. The color may be easily customized by adding appropriate coloring agents, such as dyes or colored pigments.

Example

The following non-limiting example will further illustrate the present invention.

A one inch thick sample of formaldehyde-free glass fiber duct liner made according to an embodiment of the present invention having a density of 1.5 pcf was compared to a sample of conventional glass fiber duct liner, also one inch thick and having a density of 1.5 pcf, for the following properties:

TABLE

| | Formaldehyde-free Sample | Control Sample |
|---|---|---|
| Loss of ignition | 26.1% | 29.0% |
| Tensile strength (4" × 6" size): | | |
| Cross direction | 39 lbs | 55 lbs |
| Machine direction | 44 lbs | 50 lbs |
| Thermal conductivity at 70° F. | 0.28 BTU in/h ft$^2$ ° F. (R = 36) | 0.28 BTU in/h ft$^2$ ° F. (R = 36) |

Figure 6:
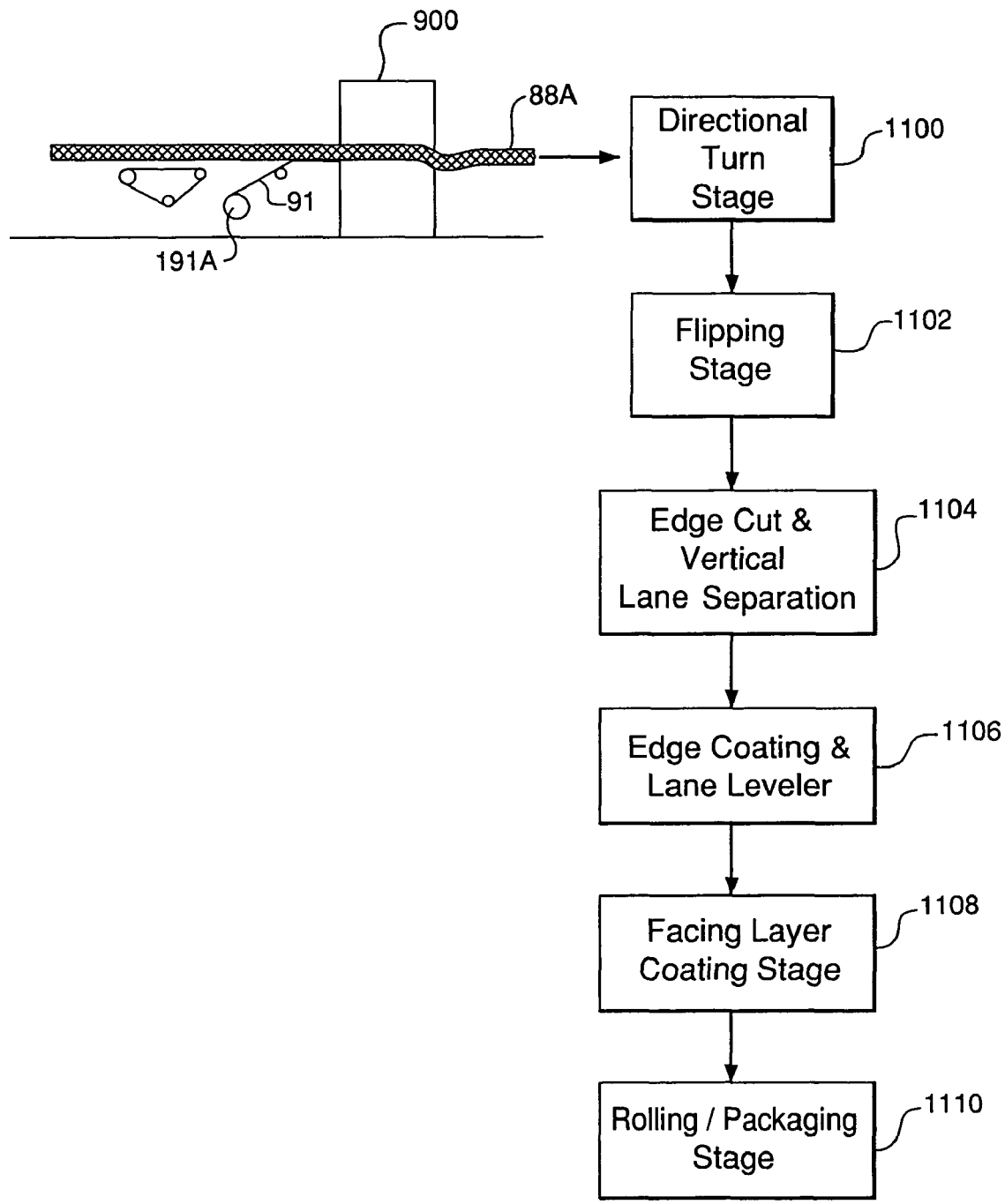
FIG. 6 is a schematic illustration and flow chart diagram of a continuous system and process for manufacturing duct liner.

FIG. 6 illustrates a continuous process for making duct liner. In one embodiment, as is conventional with some commercial air laid manufacturing systems as described above in connection with FIG. 2, the duct liner 88A is formed with facing layer 91 on the bottom surface thereof, i.e., the facing layer is dispensed from a roll 191A disposed below the duct liner as it is conveyed. In some commercial systems, the glass fiber scrim 91 is generally applied to the bottom side of the basic mat in order to reduce the loss of powder resin binder during the manufacturing process. The duct liner insulation may comprise a non-liquid substantially formaldehyde-free binder described above or a phenolic binder, such as a phenolic powder binder. Because the prior art systems are not continuous, the upward or downward orientation of the facing layer of formed mat 88A is not a matter of concern. In the prior art systems, the mat 88A is rolled for temporary storage after formation and then later unrolled for application of the water resistant coating thereto, at which time the facing layer can be manually oriented upward for coating. In contrast, in one embodiment of a continuous system, the mat 88A is automatically flipped at a flipping stage 1102 to orient the facing layer upward for later coating.

Figure 7:
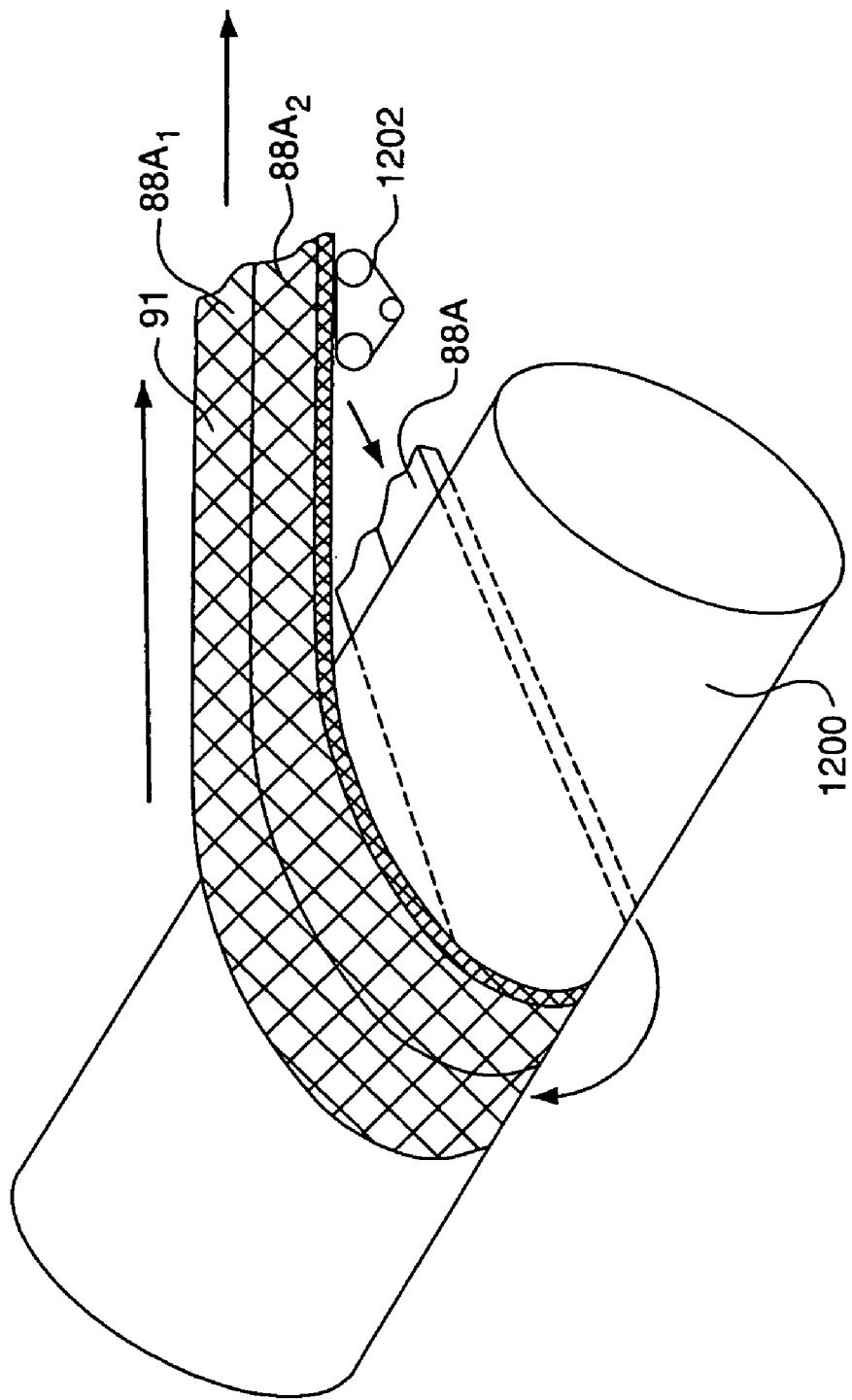
FIG. 7 is an illustration of an apparatus for flipping duct liner prior to coating.

FIG. 7 illustrates a flipping stage for re-orienting the matt 88A in a continuous process. In the flipping stage of FIG. 7, the mat 88A is provided transverse to the bottom of a cylindrical drum 1200. The drum preferably has a diameter that is sufficiently large to allow for gradual re-orientation of mat 88A, thereby preventing deterioration, distortion or twisting of the mat 88A during flipping. The drum preferably has a diameter between about 50-300 cm, and more preferably between about 100 to about 200 cm, and has a smooth, low friction outer surface. In one embodiment, the drum 1200 may be formed from steel or aluminum, with or without a textured, chrome or rubberized surface thereon. The mat 88A wraps around approximately one third to one half the circumference of the drum 1200 and emerges transverse to the top surface of the drum 1200 at a directional angle between about 90-180° from the original conveying direction of the mat to the drum 1200. In one embodiment, the mat 88A is pulled through the flipping stage by one or more conveyors 1202 oriented on the top and/or bottom of the mat 88A. Optionally, drum 1200 may rotate to further facilitate movement of the mat 88A therearound.

FIG. 7 also illustrates that the duct liner 88A may comprise more than one lane of duct liner, e.g., lanes $88A_1$ and $88A_2$.

Figure 8:
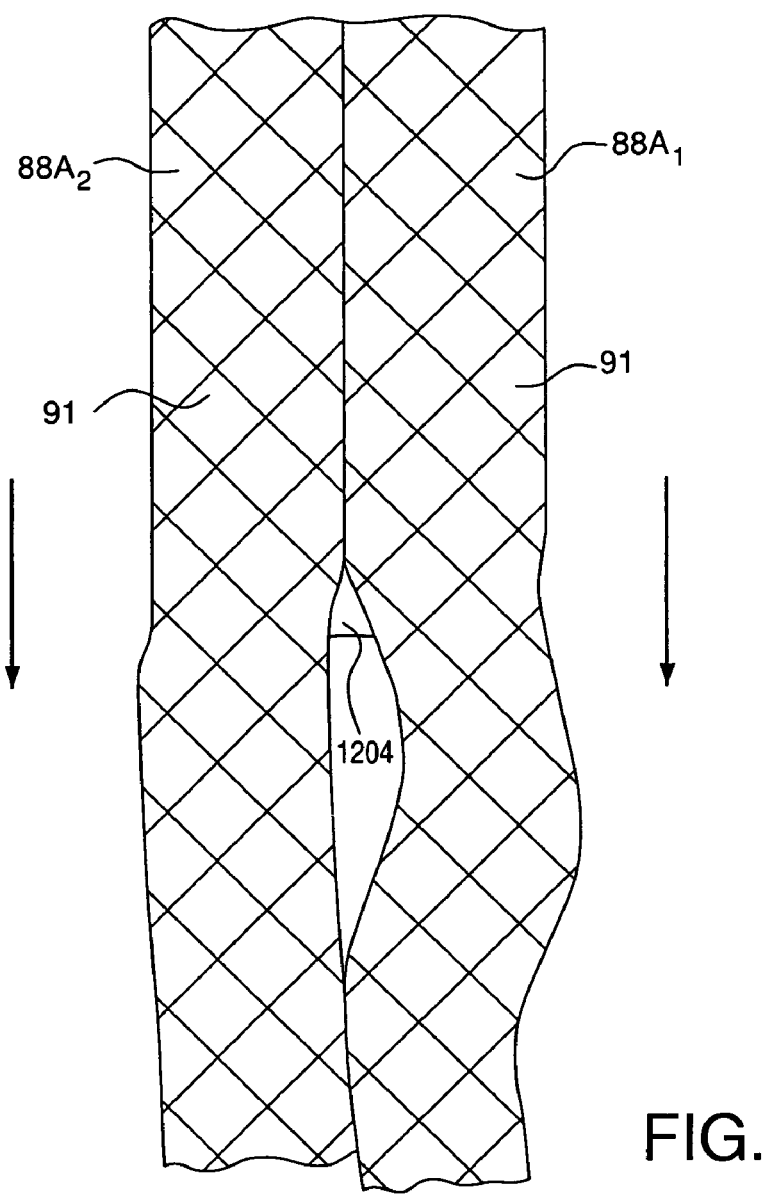
FIGS. 8 and 8A illustrate a vertical lane separator.
Figure 8A:
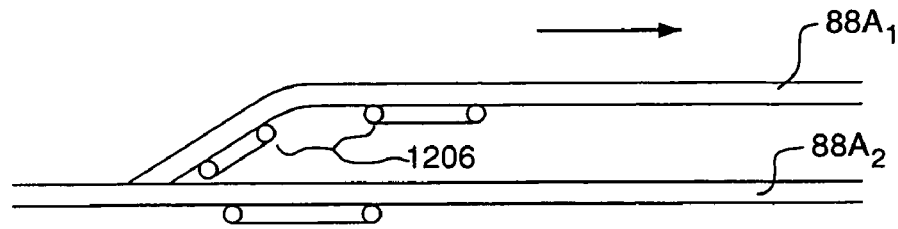

In the embodiment where the mat 88A comprises more than one lane, the mat is conveyed to an edge cut and vertical lane separator stage 1104. In one embodiment shown in the top view of FIG. 8, the lanes $88A_1$ and $88A_2$ are first slightly horizontally separated, such as with a pie wedge 1204. The lateral edges of each lane are then trimmed with a series of knives (not shown) to provide smooth finished vertical edges. As shown by the combination of FIGS. 8 and 8A, the lanes are then vertically separated, such as by using angled conveyor assembly 1206, which aligns lanes $88A_1$ above lane $88A_2$ into a desired alignment.

FIG. 9 illustrates the spraying of the lateral edges of lanes $88A_1$ and $88A_2$ as the vertically separated lanes travel in the direction of the arrow 1210. In one embodiment, four edge spray coaters 1208 are provided, one for each edge to be coated. In one embodiment, edge coaters 1208 spray a water-resistant epoxy or latex foam, as described above. At least some of the edge coaters are preferably movable in the lateral direction (arrow 1212) transverse to the conveying direction to accommodate lanes of different widths. For example, lanes can typically vary in width, depending on the desired product, from about 30" to about 75". By vertically separating the lanes during edge coating, factory space is greatly saved over prior art systems because no horizontal separation, often two or more feet of separation, is required between the lanes to provide space for the edge coaters that coat the interior edges of the lanes, i.e., the adjacent edges of the lanes $88A_1$ and $88A_2$. This embodiment saves at least twice the width of each coater 1208 over prior art systems, assuming as shown in FIG. 9 that the interior edges of lanes $88A_1$ and $88A_2$ are substantially horizontally aligned, although vertically separated. In an alternative embodiment shown in FIG. 9A, the exterior edge of lane $88A_2$ is substantially aligned with the interior edge of lane $88A_1$. Assuming the edge coaters 1208 are arranged substantially adjacent the edges of the lanes, the edge coating stage of FIG. 9 has a maximum width of about the maximum width of one lane, e.g., about 75", plus the width of two edge coaters. If the lanes are of equal width, both side edges are preferably aligned in this embodiment. If the lanes have different widths, a pair of edges are preferably aligned in this embodiment. A system that does not use vertical separation must utilize horizontal separation to provide room for multiple interior edge coaters and have a minimum footprint of 150", plus the horizontal separation between the lanes plus the width of the two edge coaters for coating the exterior edges of the lanes. It is also recognized that any horizontal alignment between those shown in FIG. 9 and FIG. 9A also save space relative to the prior art systems and are contemplated embodiments although not shown.

As shown in FIG. 6, at the end of stage 1106, the two lanes are again brought into the same vertical level and adjacent one another (FIG. 10), such as by using a downwardly sloping conveyor (not shown). The mat 88A is then provided to a facing layer coating stage 1108. At stage 1108, the facing layer 91, which is upwardly oriented after flipping stage 1102, is coated with a water resistant coating. In one embodiment shown in FIG. 10, a knife coater 1214 is employed to evenly distribute a deposited water-resistant coating onto the facing layer 91 of the duct liner 88A. In one embodiment, less than 10 gr/ft$^2$, and more preferably less than 5 gr/ft$^2$, of coating are applied to the facing layer 91 of the duct liner 88A.

The coated mats are then dried in a drying oven (not shown) in which hot air with a temperature of about 350° F. or lower is blown through the mat. In one embodiment, after drying the mats, the mats are cut to desired lengths between about 50 to about 100 feet and then rolled and packaged (stage 1110) using techniques familiar to those in the art.

As shown in FIG. 6, the continuous system may also include one or more directional turn stages 1100 used to change the mat direction to improve the use of space within the manufacturing facility. In one embodiment, using a series of conveyors, the mat makes one or more turns between about 45-135°, and preferably about 90°, between the forming stage (e.g., FIG. 2) and the on-line coating process (i.e., stages 1102 through 1108), thus reducing the length needed for a continuous system.

By merging the coating and mat formation processes into a continuous process, the efficiency of the process is improved and labor demands are decreased. In order to facilitate this merger and to further improve the efficiency of the process, in one embodiment, the process and system utilize a flipping stage and/or a vertical separation stage. The flipping stage orients the facing layer for application of the water-resistant coating, and the vertical separation stage conserves factory space during edge coating. The terms "continuous process" means that the manufacturing and coating processes are performed substantially as part of the same manufacturing process, i.e., the formed mat is automatically conveyed after formation to the coating stages as opposed to being temporarily stored and then physically transported to a coating stage after temporary storage.

While the foregoing invention has been described with reference to the above embodiments, various modifications and changes can be made without departing from the spirit of the invention. Accordingly, all such modifications and changes are considered to be within the scope of the appended claims. For example, although FIG. 6 shows the edge cut and vertical lane separation stage 1104 and edge coating and lane leveler stage 1106 positioned before the facing layer coating stage 1108, this is not a requirement, i.e., stage 1108 could precede stages 1104 and 1106. Further, flipping stage 1102 could be disposed between stage 1106 and stage 1108. Still further, although FIG. 7 illustrates duct liner 88A having more than one lane, the duct liner can be cut into multiple lanes after being flipped by a flipping stage 1102.

What is claimed is:

1. A continuous method of making duct liner, comprising the steps of:
    forming at least one lane of duct liner insulation having top and bottom surfaces and a pair of side edges, said duct liner insulation having a facing layer on at least the bottom surface of said duct liner insulation, wherein said bottom surface faces downward after said forming step;
    flipping said duct liner insulation and facing layer while said duct liner is conveyed, whereby said top surface faces downward and said facing layer faces upward; and
    applying a coating to said upwardly facing layer, wherein said duct liner insulation is conveyed as part of a continuous manufacturing process from said forming step to said applying step.

2. The method of claim 1, wherein said coating is a water-resistant coating comprising an epoxy or latex foam.

3. The method of claim 1, further comprising applying said coating to said side edges.

4. The method of claim 1, wherein said forming step comprises forming at least two lanes of duct liner insulation comprising a first lane of duct liner insulation and a second lane of duct liner insulation, wherein each lane of duct liner insulation comprises a facing layer on a bottom surface thereof, the method further comprising the steps of:
    separating said first and second lanes of duct liner insulation;
    after said separating step, applying said coating to said side edges of said lanes of duct liner insulation.

5. The method of claim 4, wherein said separating step comprises vertically separating said first and second lanes, wherein at least one side edge from each of said first and second lanes is substantially horizontally aligned before applying said coating to said side edges.

6. The method of claim 4, wherein said separating step comprises vertically separating said first and second lanes, said method further comprising the steps of:
    after said edge applying step, bringing said first and second lanes into a common vertical level; and
    applying said coating to the facing layer of each lane of duct liner insulation.

7. The method of claim 6, wherein said forming step comprises an air laid process.

8. The method of claim 1, wherein said forming step comprises an air laid process.

9. The method of claim 1, wherein said duct liner insulation comprises textile glass fibers, rotary glass fibers, organic fibers, natural fibers or a combination thereof.

10. The method of claim 9, wherein said duct liner insulation comprise a non-liquid substantially formaldehyde-free or phenolic binder.

11. The method of claim 10, wherein said non-liquid substantially formaldehyde-free binder comprises plastic-containing bonding fibers.

12. The method of claim 10, wherein said non-liquid substantially formaldehyde-free binder comprises a thermoplastic or thermosetting powder binder.

13. The method of claim 10, wherein said at least one non-liquid substantially formaldehyde-free binder comprises a mixture of plastic-containing bonding fibers and at least one powder binder.

14. A continuous method of making duct liner, comprising the steps of:
    forming at least one lane of duct liner insulation having top and bottom surfaces and a pair of side edges, wherein said bottom surface faces downward after said forming step;
    flipping said duct liner insulation while said duct liner is conveyed, whereby said top surface faces downward; and
    applying a water-resistant coating to at least one of said top and bottom surfaces, wherein said duct liner insulation is conveyed as part of a continuous manufacturing process during said forming, flipping and applying steps.

* * * * *